(Model.)
T. I. STOCKMAN.
DRESS CUTTER'S RULE.
No. 400,504. Patented Apr. 2, 1889.
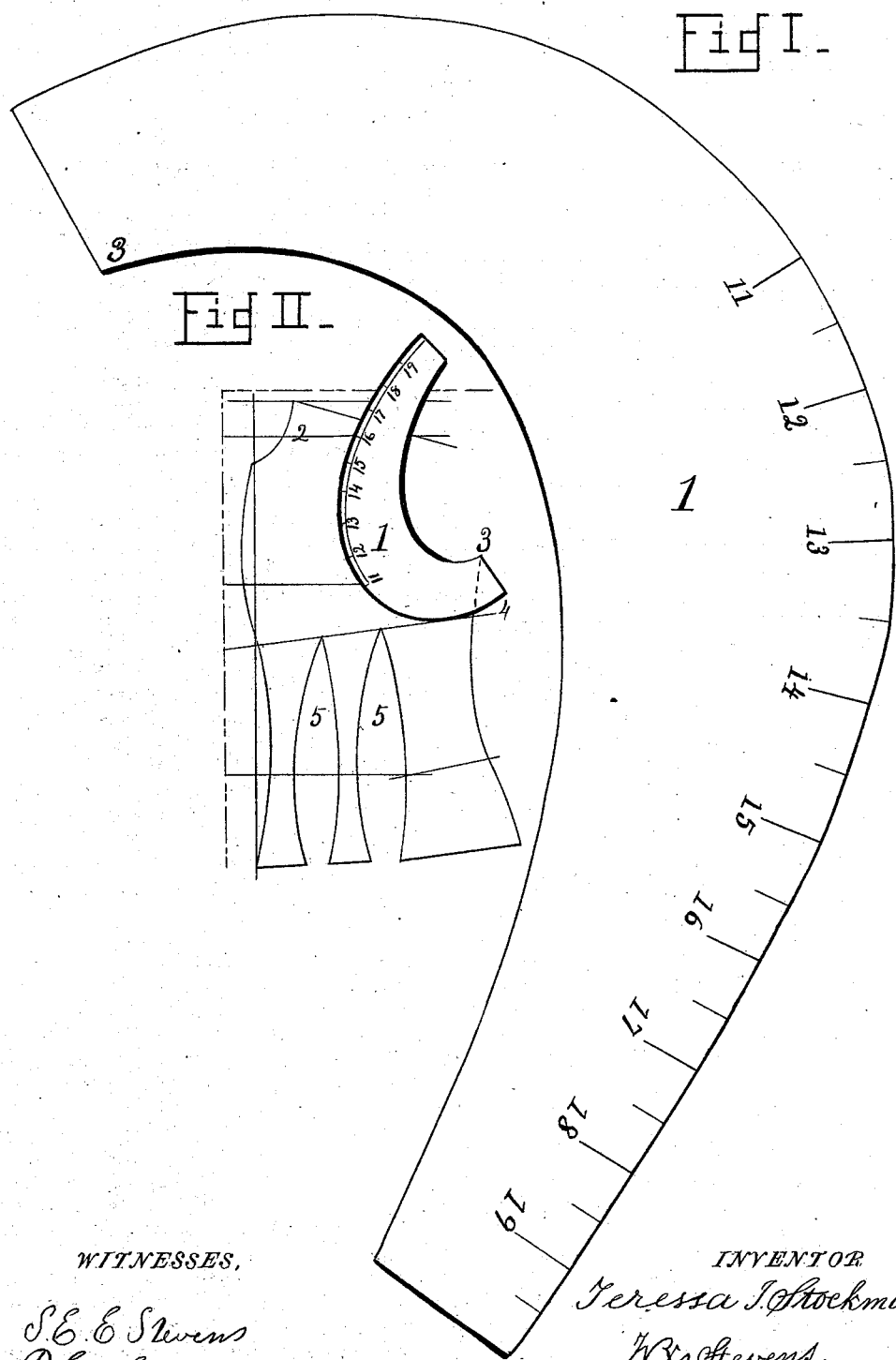
WITNESSES,
S. E. E. Stevens
P. E. Stevens
INVENTOR
Teressa I. Stockman
W. P. Stevens,
Attorney

UNITED STATES PATENT OFFICE.

TERESSA I. STOCKMAN, OF COUNCIL BLUFFS, IOWA.

DRESS-CUTTER'S RULE.

SPECIFICATION forming part of Letters Patent No. 400,504, dated April 2, 1889.

Application filed November 7, 1888. Serial No. 290,194. (Model.)

*To all whom it may concern:*

Be it known that I, TERESSA I. STOCKMAN, a citizen of the United States, residing at Council Bluffs, in the county of Pottawattamie and State of Iowa, have invented certain new and useful Improvements in Dress-Cutters' Rules; and I do hereby declare the following to be a full, clear, and exact description of the invention, such as will enable others skilled in the art to which it appertains to make and use the same.

This invention relates to that class of dress-cutters' rules which have curved edges, whereby the various curves of a dress-pattern may be marked, and which have, furthermore, scales marked on them to aid in locating certain lines according to measure; and its object is to provide means whereby an inexperienced operator may be guided to locate the curves of a dress-pattern correctly.

To this end my invention consists in a dress-cutter's rule shaped and marked as hereinafter described and claimed, reference being had to the accompanying drawings, in which—

Figure I represents one of my rules measuring ten and three-quarters inches in length in a straight line, and Fig. II represents my rule and so much of a diagram of a dress-pattern as is necessary to the full understanding of the characteristics of the rule.

1 represents the said rule, having two curved side edges and two straight-edged ends. The curves of the sides are somewhat elliptical, the outer or convex curve being of a much larger ellipse than the inner or concave curve, and the two ellipses are not parallel either in their curves or their axes. Its appearance is that of a truncated crescent in perspective, with the two horns cut to unequal lengths. Upon the convex edge of the longer horn is a graduated scale marked with numbers from 11 to 19. The shortest of these graduations is at one end of the rule and numbered 19, and is seven-eighths of one inch. No. 18 is fifteen-sixteenths. No. 17 is thirty-one thirty-seconds. No. 16 is one inch. No. 15 one and three thirty-seconds. No. 14 is one and three-sixteenths. No. 13 is one and three-eighths and is the longest of the graduations, No. 12 being one and one-quarter, and No. 11 one and three-sixteenths inch. I do not know what geometric rule, if any, governs these graduations; but the arbitrary measures given are for a rule of ten and three-quarters inches in length and curved, as shown. A little variation from these measures would make no appreciable difference in the degree of accuracy required in cutting dresses.

To enable any person skilled in the art to operate or use this rule, I here state that the numbers of the said graduations and the peculiar relation thereto and to each other of the two curved edges described are the result of experiment based on the theory that the concave curve may be located properly to form an arm-scye of any size by first drawing certain arbitrary lines according to a chart and instructions which I furnish with each scale, and then placing that number of the scale which corresponds to the number of inches around the arm-scye in question against one of the said arbitrary lines, while a corner of the scale is located at another.

In the drawings, let 2 represent one of the arbitrary lines. Then by placing the mark 16 of the scale at that line and the corner 3 of the rule at the under-arm seam the rule will be in position to draw by its concave edge the proper curve for an arm-scye of sixteen inches measure, and so on for other numbers of the scale. When the rule is in this position, a line, 4, drawn tangent to its lower edge at a certain slant, locates the upper ends of the darts 5, and the curves of the pattern may be drawn by the edge of the rule. Thus the rule described is peculiarly adapted for various services in dress-cutting, and in connection with a book of instructions, which I furnish to go with it, is a great aid to accurate fitting.

Having thus fully described my invention, what I believe new, and desire to secure by Letters Patent, is the following claim:

A dress-cutter's rule having one side edge convex and the other concave, the curves of the said edges being partially elliptical, the ends being straight-edged and narrower than the midway portion, the convex edge being provided with a scale of graduations numbered from 11 to 19 and bearing the described proportional ratio to the whole length of the rule, substantially as shown and described, whereby the concave curve of the rule may be located as a guide to draw an arm-scye on a dress, as set forth.

In testimony whereof I affix my signature in presence of two witnesses.

TERESSA I. STOCKMAN.

Witnesses:
D. C. BLOOMER,
C. C. CHAMBERLIN.